US008966959B2

United States Patent
Miyashita et al.

(10) Patent No.: US 8,966,959 B2
(45) Date of Patent: Mar. 3, 2015

(54) FILTER INSPECTION METHOD AND FILTER INSPECTION APPARATUS

(75) Inventors: Kouichi Miyashita, Kasugai (JP); Yusuke Okuma, Mizuho (JP)

(73) Assignee: NGK Insulators, Ltd., Nagoya (JP)

( * ) Notice: Subject to any disclaimer, the term of this patent is extended or adjusted under 35 U.S.C. 154(b) by 153 days.

(21) Appl. No.: 13/431,096

(22) Filed: Mar. 27, 2012

(65) Prior Publication Data

US 2012/0247224 A1 Oct. 4, 2012

(30) Foreign Application Priority Data

Mar. 30, 2011 (JP) .................................. 2011-074712

(51) Int. Cl.
  *G01N 15/08* (2006.01)
  *G01M 3/20* (2006.01)
  *B01D 65/10* (2006.01)
  *B01D 46/24* (2006.01)
  *G01F 1/00* (2006.01)

(52) U.S. Cl.
  CPC ............... *G01M 3/20* (2013.01); *B01D 65/10* (2013.01); *B01D 46/2418* (2013.01); *B01D 2273/18* (2013.01)
  USPC .............................................. 73/38; 73/861

(58) Field of Classification Search
  CPC . G01N 15/0826; G01N 15/08; G01N 15/082; G01N 15/0806; G01N 15/088; G01M 3/36; G01M 3/3236; G01M 3/027; G01M 3/3254; G01M 3/202; G01M 3/20; G01M 3/226; G01M 3/205; G01M 3/229; G01M 3/26; G01M 3/24; G01B 13/22
  USPC ....................................... 73/38, 37, 40.7, 861
  See application file for complete search history.

(56) References Cited

U.S. PATENT DOCUMENTS

| 3,840,402 | A | * | 10/1974 | Tobin, III .......................... 134/29 |
|---|---|---|---|---|
| 5,398,541 | A | | 3/1995 | Hijikata et al. |
| 5,417,101 | A | * | 5/1995 | Weich ................................ 73/38 |
| 7,012,678 | B2 | | 3/2006 | Enomoto et al. |
| 7,410,528 | B2 | * | 8/2008 | Rae et al. ......................... 95/273 |
| 7,648,549 | B2 | * | 1/2010 | Gargano et al. ................. 55/523 |
| 2003/0112437 | A1 | * | 6/2003 | Enomoto et al. ............. 356/402 |

(Continued)

FOREIGN PATENT DOCUMENTS

| CN | 101437597 A | 5/2009 |
|---|---|---|
| CN | 101796381 A | 8/2010 |

(Continued)

OTHER PUBLICATIONS

Japanese Office Action (Application No. 2011-074712) dated Jun. 10, 2014.
Chinese Office Action, Chinese Application No. 201210078357.2, dated Nov. 15, 2014 (7 pages).

*Primary Examiner* — Hezron E Williams
*Assistant Examiner* — Marrit Eyassu
(74) *Attorney, Agent, or Firm* — Burr & Brown, PLLC

(57) ABSTRACT

There is disclosed a filter inspection method which is excellent in sensitivity to detect defects of a filter and in operation efficiency. The filter inspection method includes a humidifying step of exposing a porous filter to moisture-containing air; and a detecting step of introducing water particles into the filter in a wet state through the humidifying step, to detect the water particles which pass through and flow out of the filter, thereby detecting defects of the filter.

16 Claims, 5 Drawing Sheets

(56) References Cited

U.S. PATENT DOCUMENTS

| | | | |
|---|---|---|---|
| 2006/0151926 A1* | 7/2006 | Zoeller, III | 264/603 |
| 2006/0174695 A1 | 8/2006 | Miyashita et al. | |
| 2007/0238191 A1 | 10/2007 | Gargano et al. | |
| 2008/0173071 A1* | 7/2008 | Park et al. | 73/38 |
| 2010/0201983 A1 | 8/2010 | Hatano et al. | |
| 2011/0067485 A1* | 3/2011 | Grant et al. | 73/38 |

FOREIGN PATENT DOCUMENTS

| | | |
|---|---|---|
| EP | 2 233 908 A2 | 9/2010 |
| JP | 2002-310876 A1 | 10/2002 |
| JP | 2002-357562 | 12/2002 |
| JP | 2004-286703 | 10/2004 |
| JP | 2008-275356 A1 | 11/2008 |
| JP | 2009-115655 | 5/2009 |

\* cited by examiner

FILTER INSPECTION METHOD AND FILTER INSPECTION APPARATUS

BACKGROUND OF THE INVENTION

1. Field of the Invention

The present invention relates to a filter inspection method which can be used to detect defects such as holes or cracks generated in a porous filter, and a filter inspection apparatus.

2. Description of the Related Art

A porous filter has numerous pores, and passes a fluid to be treated through the pores, to filter the fluid. For example, a honeycomb structure made by porous partition walls captures a particulate matter included in an exhaust gas discharged from a car engine or the like, by the partition walls, whereby the exhaust gas purified by passing through the partition walls is discharged to the outside from the honeycomb structure.

If holes, cracks and the like are present in the porous filter, a substance to be actually captured passes through the filter owing to these holes, cracks, and the like, which impairs a filtering function. Thus, in the porous filter, the holes or the cracks become defects which deteriorate the function of the filter. Consequently, there have been disclosed a method of inspecting the presence/absence of defects such as the cracks and holes in the porous filter, and an inspection apparatus (Patent Documents 1 to 3).

In the Patent Documents 1 to 3, there have been disclosed an inspection method of introducing fine particles into a filter, and detecting the fine particles passed through the filter, to check the presence/absence of defects such as the holes and the cracks in the filter, and an inspection apparatus.

As the fine particles for use in the above inspection, fine particles generated by burning incense and the like (e.g., Patent Document 1) or water particles having particle diameters of several hundreds of microns or smaller (e.g., Patent Documents 2 and 3) are used.

[Patent Document 1] JP-A-2002-357562
[Patent Document 2] JP-A-2004-286703
[Patent Document 3] JP-A-2009-115655

SUMMARY OF THE INVENTION

However, an inspection method and an inspection apparatus of Patent Document 1 require an operation of removing fine particles generated by burning incense and the like from a filter after inspection. In an inspection method and an inspection apparatus using water particles of Patent Documents 2 and 3, unevenness is generated in the inspection result, and much time is required for the water particles to pass through a filter and flow out of the filter.

In view of the above problem, an object of the present invention is to provide a filter inspection method which is excellent in sensitivity to detect a defect of a filter and in operation efficiency, and a filter inspection apparatus.

The present invention has been developed to achieve the above object, and provides a filter inspection method and a filter inspection apparatus as follows.

According to a first aspect of the present invention, a filter inspection method is provided, the filter inspection method comprising: a humidifying step of exposing a porous filter to moisture-containing air; and a detecting step of introducing water particles into the filter in a wet state through the humidifying step, to detect the water particles which pass through and flow out of the filter, thereby detecting defects of the filter.

According to a second aspect of the present invention, the filter inspection method according to the first aspect is provided, wherein in the humidifying step, a mass of the filter is increased as much as 0.05 to 600 g per liter of a volume of the filter by water contained in the moisture-containing air.

According to a third aspect of the present invention, the filter inspection method according to the first or second aspect is provided, wherein in the humidifying step, while exposing one side of the filter to the moisture-containing air, the moisture-containing air is sucked from the other side of the filter.

According to a fourth aspect of the present invention, the filter inspection method according to the first or second aspect is provided, wherein in the humidifying step, the moisture-containing air is introduced under pressure into one side of the filter.

According to a fifth aspect of the present invention, the filter inspection method according to any one of the first through fourth aspects is provided, wherein while exposing the one filter to the moisture-containing air in the humidifying step, defects of the other filter subjected to the humidifying step are detected in the detecting step.

According to a sixth aspect of the preset invention, a filter inspection apparatus comprising: humidifying means for exposing a porous filter to moisture-containing air; and detecting means for introducing water particles into the filter exposed to the moisture-containing air and in a wet state through the humidifying means, to detect the water particles which pass through and flow out of the filter, thereby detecting defects of the filter.

According to a seventh aspect of the present invention, the filter inspection apparatus according to the sixth aspect is provided, wherein the humidifying means increases a mass of the filter as much as 0.05 to 600 g per liter of a volume of the filter by water contained in the moisture-containing air.

According to an eighth aspect of the present invention, the filter inspection apparatus according to the sixth or seventh aspect is provided, wherein while exposing one side of the filter to the moisture-containing air, the humidifying means sucks the moisture-containing air from the other side of the filter.

According to a ninth aspect of the preset invention, the filter inspection apparatus according to the sixth or seventh aspect is provided, wherein the humidifying means introduces the moisture-containing air under pressure into one side of the filter.

According to the tenth aspect of the present invention, the filter inspection apparatus according to any one of the sixth through ninth aspects is provided, wherein while the humidifying means exposes the one filter to the moisture-containing air, the detecting means detects defects of the other filter.

A filter inspection method and a filter inspection apparatus of the present invention are excellent in sensitivity to detect defects of a filter and in operation efficiency.

DETAILED DESCRIPTION OF THE INVENTION

Figure 1:
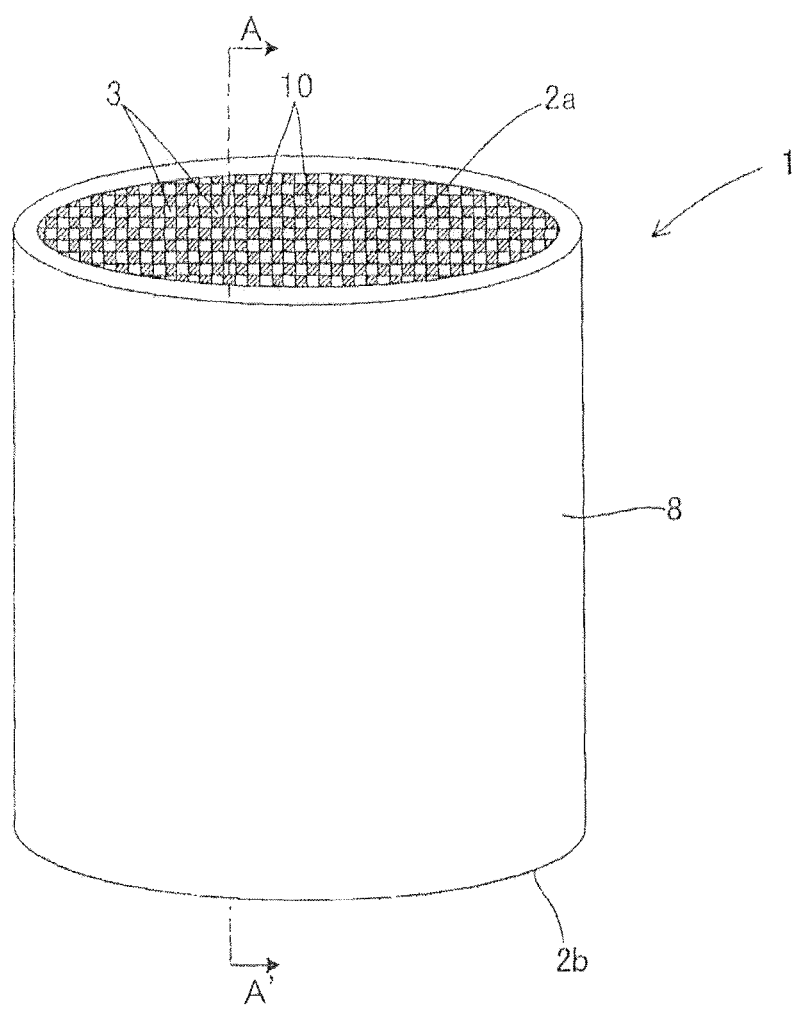
FIG. 1 is a perspective view of a honeycomb filter.

Hereinafter, embodiments of the present invention will be described with reference to the drawings. The present invention is not limited to the following embodiments, and changes, modifications and improvements can be added without departing from the scope of the present invention.

According to a filter inspection method of the present invention, a porous filter (hereinafter the porous filter will simply be referred to as "the filter" unless otherwise specified) is an object. When detects are present in the filter, these defects can be detected.

The filter inspection method of the present invention includes a humidifying step of exposing the filter to moisture-containing air. Furthermore, the filter inspection method of the present invention includes a detecting step of introducing water particles into the filter in a wet state through the humidifying step, to detect the water particles which pass through and flow out of the filter, thereby detecting the defects of the filter.

When the water particles are applied to one side of the filter, the water particles having such particle diameters that the particles can pass through pores present in the filter tend to pass through the pores and flow out of the filter through the opposite side thereof. When defects such as holes and cracks are present in the filter, more water particles tend to pass through a portion where the defect is present than through a portion where any defect is not present, and water particles having such large particle diameters that the particles cannot inherently pass through the pores tend to pass through the portion where the defect is present. Therefore, when the water particles are applied to one side of the filter to observe the number of the water particles flowing out of the filter through the opposite side thereof and the sizes of the water particles, the presence/absence of the defects in the filter can be judged. Furthermore, it is possible to identify the portion where the defect is present, depending on a shape of the filter or detecting conditions.

In the method in which the water particles are applied to the filter to detect the defects of the filter, when the filter which is a detection object is dry, the water particles are absorbed by the filter. In consequence, there is a tendency that the water particles do not easily pass through the filter. For example, when the water particles are applied to the filter, the absorption of the water particles occurs in part of the filter. In this case, even when the defect is present in this part, the behavior of the outflow of the water particles might become the same between the part where the defect is present and another normal part. In this case, the presence of the defect cannot be detected. Moreover, when the water particles are applied to the filter, the absorption of the water particles occurs in a large part of the filter, and the absorption of the water particles does not occur in part of the filter. In this case, even if any defect is not present in the filter, the water particles might flow out of the filter through the part where the absorption of the water particles does not occur more than the other part. In this case, it is wrongly judged that the defects are present in a normal filter where any defect is not to be present.

As in the filter inspection method of the present invention, the surface of the filter is beforehand in the wet state through the humidifying step. In this case, when the water particles are then applied to the filter, the water particles are not easily absorbed by the filter. Therefore, in the filter inspection method of the present invention, it is possible to decrease cases where the detection of the filter having the defects is missed and the normal filter is wrongly judged to have the defects owing to the absorption of the water particles by the filter as in the above examples.

Moreover, in the detecting step, the filter in the wet state through the humidifying step is the object of the detection step. Consequently, there is a tendency that the water particles introduced into the filter do not easily adhere to or reside in the surface of the filter, do not easily penetrate the filter, or are not easily held in the filter. Therefore, in the present invention, when the water particles are introduced into the filter in the detecting step, the water particles tend to immediately pass through the filter and flow out of the filter. Therefore, it is possible to shorten a time required for the detecting step. Moreover, in the present invention, a time from when the water particles start to be introduced into the filter to when the state of the water particles flowing out of the filter is stabilized tends to shorten. That is, in the filter inspection method of the present invention, when the water particles start to be introduced into the filter, it is possible to obtain, in a short time, a state where the defects can be detected.

Further in the filter in the wet state through the humidifying step, when water sticking to the filter evaporates, heat is taken from the filter. Therefore, in the present invention, the detecting step can be performed after lowering a temperature of the filter. When the water particles are introduced into the filter having the lowered temperature in the detecting step, the water particles are not easily vaporized under the heat of the filter. Therefore, the number of the water particles detected in the detecting step increases. In consequence, sensitivity to detect the defects of the filter can be enhanced.

Moreover, in the filter inspection method of the present invention, the filter subjected to the humidifying step does not have to be immediately subjected to the detecting step, as long as the filter in the wet state through the humidifying step can be subjected to the detecting step. For example, the filter subjected to the humidifying step may be left on standby for a while, and then subjected to the detecting step. In the filter inspection method of the present invention, when a length of a standby time after the humidifying step can be adjusted, it is possible to perform inspection in accordance with situations such as an operator's operation time and a congestion degree of devices for use in the detecting step. It is to be noted that in the filter inspection method of the present invention, a time to perform the detecting step after the humidifying step is preferably within one hour.

In the filter inspection method of the present invention, it is preferable that in the humidifying step, a mass of the filter is increased as much as 0.05 to 600 g per liter of a volume of the filter by water contained in the moisture-containing air. In this case, the filter is not dry or is not excessively wet, which is a suitable state for the defect detection by use of the water particles. Furthermore, as to the above numeric range from the viewpoint that the filter can be prevented from being excessively wet, an upper limit value of the increased mass per liter of the volume of the filter by the water contained in the moisture-containing air is more preferably 500 g, and especially preferably 100 g. Moreover, from the viewpoint that the filter can be prevented from being dried, a lower limit value of the increased mass per liter of the volume of the filter by the water contained in the moisture-containing air is more preferably 0.1 g, and especially preferably 10 g.

In the filter inspection method of the present invention, it is preferable that in the humidifying step, while exposing one end surface of the filter to the moisture-containing air, the moisture-containing air is sucked from the other end surface of the filter. In this case, the filter can evenly be wetted. Therefore, in the detecting step, the adsorption of the excessive water particles in part of the filter can be suppressed.

Therefore, the behavior of the water particles flowing out of the filter can more clearly be reflected in the presence/absence of the defects in the detecting step. It is to be noted that one side of the filter and the other side of the filter indicate a relation between an inflow side of a fluid into the filter and an outflow side of the fluid which has flowed into the filter, when the fluid passes through the filter in one direction.

In the filter inspection method of the present invention, it is preferable that in the humidifying step, the moisture-containing air is introduced under pressure into the one side of the filter. In this case, the filter can evenly be wetted. Therefore, the absorption of the excessive water particles by part of the filter can be suppressed in the detecting step. Therefore, the behavior of the water particles flowing out of the filter can more clearly be reflected in the presence/absence of the defects in the detecting step.

In the filter inspection method of the present invention, it is preferable from a viewpoint of raising an efficiency that while exposing the one filter to the moisture-containing air in the humidifying step, defects of the other filter subjected to the humidifying step are detected in the detecting step. In consequence, a time to perform the humidifying step of the one filter entirely or partially overlaps with a time to perform the detecting step of the other filter, whereby it is possible to inspect more filters in a predetermined time.

A filter inspection apparatus of the present invention includes humidifying means for exposing a porous filter to moisture-containing air; and detecting means for introducing water particles into the filter exposed to the moisture-containing air and in a wet state through the humidifying means, to detect the water particles which pass through and flow out of the filter, thereby detecting defects of the filter.

When the filter is exposed to the moisture-containing air and is in the wet state through the humidifying means, the cases where the defects cannot be detected and are missed and the normal filter is wrongly judged to be defective do not easily occur for the above reasons. Moreover, when the filter is exposed to the moisture-containing air and in the wet state through the humidifying means, the water particles introduced by the detecting means tend to immediately pass through and flow out of the filter. Furthermore, a time required until the state of the water particles flowing out of the filter is stabilized tends to be shortened. Therefore, a time required for the detection can be shortened.

Moreover, in the filter inspection apparatus of the present invention, the filter can become a state suitable for the defect detection by use of the water particles. Therefore, the humidifying means preferably increases a mass of the filter as much as 0.05 to 600 g per liter of a volume of the filter by water contained in the moisture-containing air. In this case, the filter is not dry or is not excessively wet, and obtains the state suitable for the defect detection by use of the water particles.

Furthermore, as to the above numeric range from the viewpoint that the filter can be prevented from being excessively wet, an upper limit value of the increased mass per liter of the volume of the filter by the water contained in the moisture-containing air is more preferably 500 g, and especially preferably 100 g. Moreover, from the viewpoint that the filter can be prevented from being dried, a lower limit value of the increased mass per liter of the volume of the filter by the water contained in the moisture-containing air is more preferably 0.1 g, and especially preferably 10 g.

Furthermore, the filter inspection apparatus of the present invention can more clearly reflect the behavior of the water particles flowing out of the filter in the presence/absence of the defects. Therefore, while exposing one side of the filter to the moisture-containing air, the humidifying means preferably sucks the moisture-containing air from the other side of the filter.

In addition, the filter inspection apparatus of the present invention can more clearly reflect the behavior of the water particles flowing out of the filter in the presence/absence of the defects. Therefore, the humidifying means preferably introduces the moisture-containing air under pressure into one side of the filter.

Moreover, in the filter inspection method of the present invention, it is preferable from the viewpoint of raising an efficiency that while the humidifying means exposes the one filter to the moisture-containing air, the detecting means preferably detects defects of the other filter.

Hereinafter, an embodiment of the filter inspection method of the present invention will be described, to describe contents of the present invention in more detail.

Figure 2:
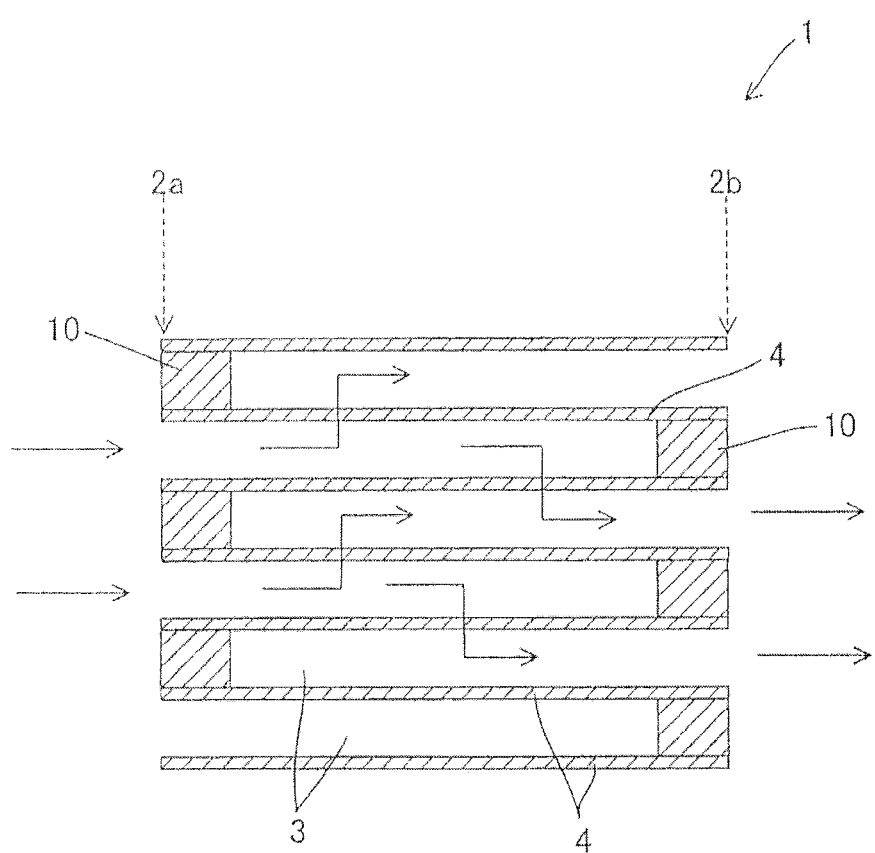
FIG. 2 is a honeycomb filter sectional view showing part of a section cut along the A-A' line of FIG. 1.

In the present embodiment, a honeycomb filter is a test object. FIG. 1 shows a perspective view of a honeycomb filter 1 which becomes the test object. As shown, the honeycomb filter 1 has an appearance in which two end surfaces 2a and 2b are connected by a cylindrical outer peripheral wall 8. FIG. 2 is an exemplary view of a section of the honeycomb filter 1, and shows part of the section cut along the A-A' line of FIG. 1. Inside the filter, a plurality of cells 3 are partitioned by porous partition walls 4, to extend through the filter between the two end surfaces 2a and 2b. An end portion of each of the cells 3 on the side of the end surface 2a or 2b is closed with a plugged portion 10. Furthermore, when the end surfaces 2a and 2b are seen from the front surface of the filter, the plugged portions 10 are alternately arranged.

Figure 3:
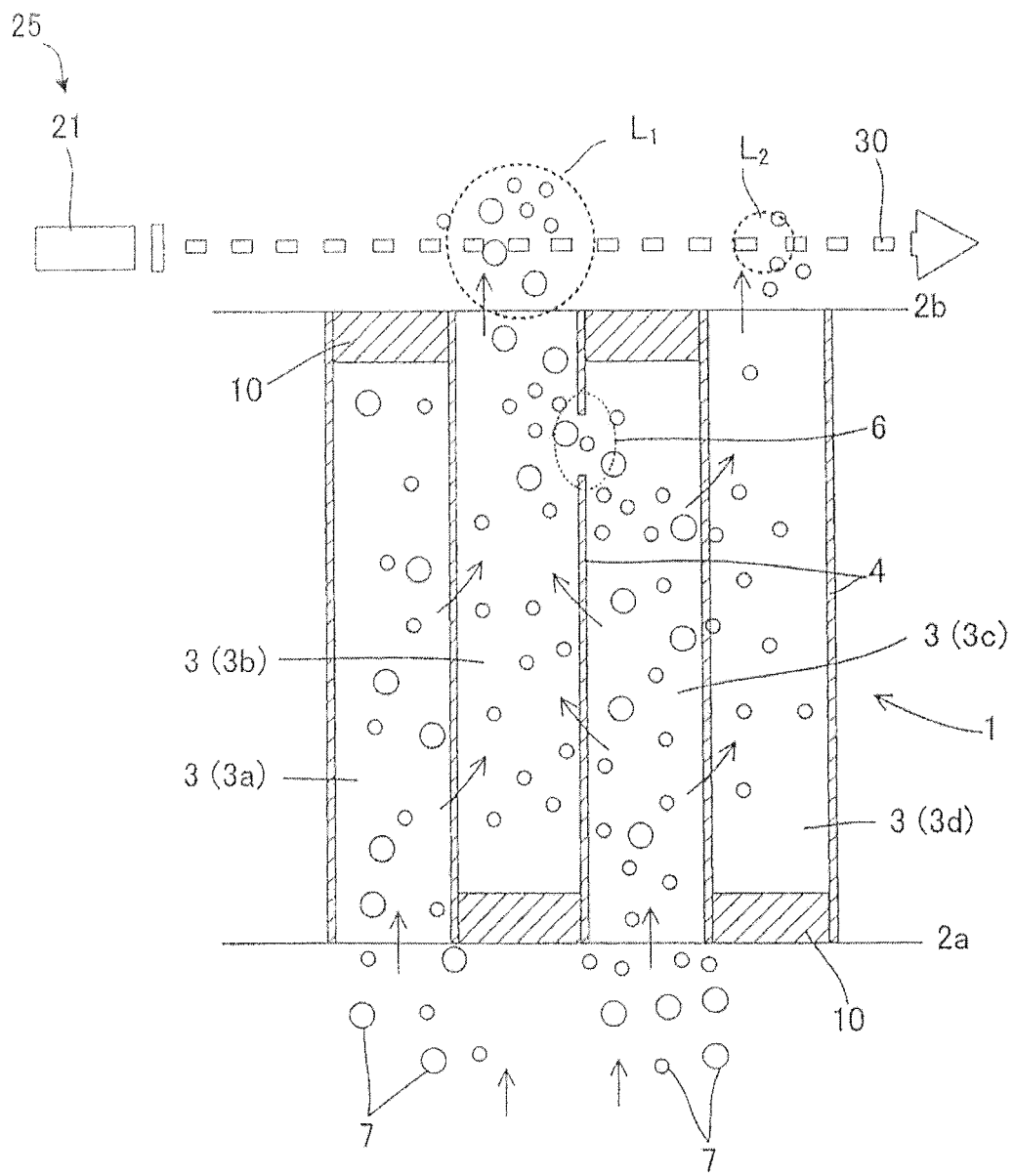
FIG. 3 is an explanatory view concerning a principle of defect detection in an embodiment of a filter inspection method of the present invention.

FIG. 3 schematically shows the behavior of defect detection in the present embodiment. A principle of the defect detection in the present embodiment will be described with reference to this view.

In the end surface 2a of the honeycomb filter 1, cells 3a and 3c are open. When water particles 7 are introduced into the cells 3a and 3c from the end surface 2a of the honeycomb filter 1, the water particles 7 pass through pores of the partition walls 4 by which the cells 3a and 3c are partitioned, and flow into adjacent cells 3b and 3d (arrows in FIG. 3). Then, the water particles 7 flow out of the cells 3b and 3d which are open in the end surface 2b.

In the honeycomb filter 1 shown in FIG. 3, a large hole which becomes a defect 6 is present in the partition wall 4 which separates the cells 3b and 3c. A large number of water particles 7 pass through this defect 6 and flow into the cell 3b. Moreover, the large water particles 7 to be blocked by the partition wall 4 also flow into the cell 3b through the defect 6. Therefore, in the end surface 2b, the large number of water particles 7 flow out of the cell 3b, and even the large water particles 7 also flow out of the cell. On the other hand, any defect is not present in the partition wall 4 which separates the cells 3c and 3d. Therefore, the large water particles 7 can not flow into the cell 3d, and a large number of small water particles 7 do not enter the cell 3d. Therefore, in the end surface 2b, an appropriate amount of the small water particles 7 flow out of the cell 3d, and the large water particles 7 do not flow out of the cell.

In the present embodiment, the behavior of the water particles 7 flowing out of the end surface 2b is detected by using a laser device 21. The laser device 21 is disposed in the vicinity of the end surface 2b, to irradiate the end surface 2b with planar laser light 30 parallel to the end surface 2b. The laser light 30 is diffracted and scattered by the water particles 7 flowing out of the cells 3b and 3d. The scattering of this light visualizes the presence of the water particles 7, so that the water particles can be detected.

An intensity of luminance due to the scattering of the laser light 30 is correlated with the number or sizes of the water particles 7 which are present in the corresponding place. A luminance $L_1$ at a position of the cell 3b reflects the presence of the large number of water particles 7 or the presence of the large water particles 7, and hence the luminance becomes intense. On the other hand, a luminance $L_2$ at a position of the cell 3d represents the presence of a small number of water particles 7 or the presence of the small water particles 7, and hence the luminance becomes weak as compared with the luminance $L_1$ at the position of the cell 3b. It can be detected from a difference in intensity between the luminance $L_1$ and the luminance $L_2$ that the defect 6 is generated in the partition wall 4 which separates the cell 3b from the cell 3c.

Figure 4:
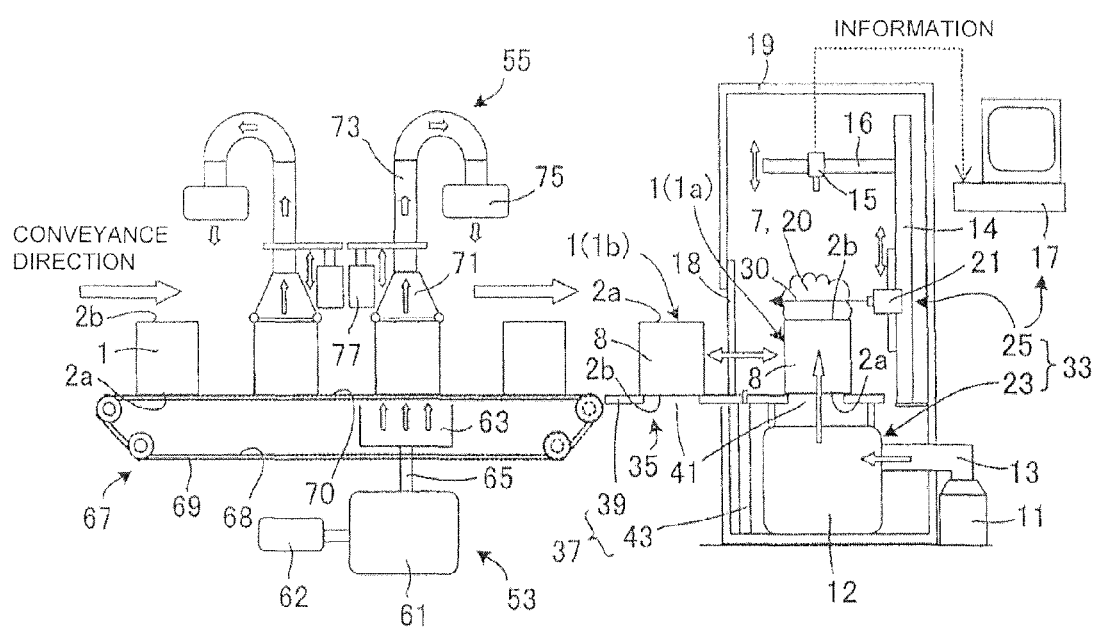
FIG. 4 is an exemplary view of an embodiment of a filter inspection apparatus of the present invention.

FIG. 4 is an exemplary view of a filter inspection apparatus which can be used for carrying out the present embodiment. An inspection apparatus 100 shown in this view corresponds to an embodiment of the filter inspection apparatus of the present invention.

The inspection apparatus 100 includes a humidifying air supply portion 53. The humidifying air supply portion 53 includes a humidifier 61 which produces moisture-containing air, a humidifying air storing chamber 63 which stores the moisture-containing air, and a duct 65 and a blower fan 62 for passing the moisture-containing air from the humidifier 61 into the humidifying air storing chamber 63.

The inspection apparatus 100 includes a conveyor 67, and a belt 69 disposed in the conveyor 67 has such a mesh-like shape that the air passes through the belt. The honeycomb filter 1 is mounted on the conveyor 67 by aligning the end surface 2a of the filter with an outer surface 70 of the belt 69.

The humidifying air storing chamber 63 is disposed inside a ring of the belt 69, so that the moisture-containing air can be discharged toward an inner surface 68 of the belt 69. Then, when the honeycomb filter 1 mounted on the belt 69 reaches a portion on the humidifying air storing chamber 63, the honeycomb filter 1 can be exposed to the moisture-containing air via the mesh-like belt 69. The moisture-containing air immediately flows into the cells 3 from the end surface 2a of the honeycomb filter 1, passes through the pores of the partition walls 4, and flows out of the end surface 2b. In consequence, the surfaces of the partition walls 4 where the pores are open or the inner walls of the pores in the honeycomb filter 1 are in the wet state. Here, open portions of the mesh-like belt 69 preferably have a cell density higher than the honeycomb filter, and this belt can suitably be selected so that there is not any difficulty in passing the moisture-containing air while supporting the honeycomb filter 1. Moreover, a material of the mesh-like belt 69 may be a metal or a resin, as long as the honeycomb filter 1 can be mounted on and supported by the belt. Furthermore, a color of the mesh-like belt 69 is preferably black, so that the reflection of the laser light or the like is prevented.

Furthermore, the inspection apparatus 100 includes a sucking portion 55. When the moisture-containing air is discharged from the humidifying air storing chamber 63 toward the end surface 2a of the honeycomb filter 1, the sucking portion 55 can suck the moisture-containing air of the cells 3 from the end surface 2b of the honeycomb filter 1.

The sucking portion 55 in an example shown in FIG. 4 will be described in detail. The sucking portion 55 includes a sucking cup 71, a duct 73, an exhaust fan 75 and an elevating cylinder 77.

The sucking cup 71 has a shape with an opening which substantially conically broadens, and this opening side of the cup is attached to the end surface 2b of the honeycomb filter 1, whereby the air can be sucked. When the sucking cup 71 is attached to the end surface 2b of the honeycomb filter 1, the position of the sucking cup 71 can vertically be moved by the elevating cylinder 77. Moreover, the air sucked by the sucking cup 71 can be discharged through the duct 73 connected to the sucking cup and the exhaust fan 75 connected to the duct.

In the inspection apparatus 100, the honeycomb filter 1 exposed to the moisture-containing air as described above is conveyed to a detecting portion 33 to detect the defect.

As shown in FIG. 4, the inspection apparatus 100 includes the detecting portion 33. Moreover, the detecting portion 33 includes a water particle introducing portion 23 and a measurement portion 25.

The water particle introducing portion 23 introduces the water particles 7 into the filter 1, and includes a humidifier 11, a mist tank 12, and a duct 13.

The humidifier 11 uses water and air as raw materials to produce mist 20 in which the water particles 7 float, and the mist 20 is fed into the mist tank 12 via the duct 13. In the mist tank 12, the mist 20 is pressurized, and the pressurized mist 20 is discharged from the mist tank 12, and introduced into the filter 1.

When the mist 20 is introduced into the filter 1, the filter is mounted on a mounting base 39 disposed in a mounting portion 37. It is to be noted that the mounting base 39 includes a circulation hole 41, and hence the mist 20 discharged from the mist tank 12 can be introduced into the filter 1.

The honeycomb filter 1 is mounted on the mounting base 39 so that the outer peripheral wall 8 of the honeycomb filter 1 is disposed right over an edge of the circulation hole 41, and the end surface 2a of the honeycomb filter 1 is exposed to face the mist tank 12 via the circulation hole 41. Therefore, the mist 20 can be sprayed from the mist tank 12 directly to the end surface 2a of the honeycomb filter 1.

As described above with reference to FIG. 3, the mist 20 flows into the cells 3 through the end surface 2a of the honeycomb filter 1, and flows out of the filter through the opposite end surface 2b.

In the inspection apparatus 100, the water particles 7 floating in the mist 20 which has flowed out of the end surface 2b are analyzed by the measurement portion 25, to detect the defect in the honeycomb filter 1. The measurement portion 25 includes the laser device 21, a camera 15, and an image analysis device 17.

As described above in the principle of the defect detection with reference to FIG. 3, the laser device 21 is disposed in the vicinity of the end surface 2b of the honeycomb filter 1 to emit the laser light 30. The laser device 21 may be attached to an elevator 14 so that a position to be irradiated with the laser light can be changed.

The camera 15 photographs the light scattered through the water particles 7. The camera 15 may be attached to an arm 16 so that the camera can vertically and horizontally be moved to adjust the position thereof.

The image analysis device 17 receives photographed information from the camera 15, to display a distribution of luminance intensities.

As shown in FIG. 4, the detecting portion 33 may have a constitution in which at least a honeycomb filter 1a as a test object and the camera 15 can be received in a closed storage chamber 19. In consequence, disturbance of movement of the water particles 7 can be suppressed. In consequence, the position where the defect 6 of the filter 1 (the honeycomb filter 1) is generated can correctly be collated from a position where a difference is made in the number of the water particles 7, the particle diameters thereof and the like. Moreover, the storage chamber 19 is provided with a door 18. When the honeycomb filter 1 is removed or placed, the door 18 may be opened. When the water particles 7 are detected, the door 18 may be closed.

Further in the inspection apparatus 100, the water particles 7 are passed through the honeycomb filter 1 from the end surface 2a toward the end surface 2b to perform first detection. Afterward, the water particles 7 are conversely passed from the end surface 2b toward the end surface 2a, whereby the second detection can be performed. When the one honeycomb filter 1 is subjected to the detection twice in this manner, accuracy to find the defect can be enhanced.

In the mounting portion 37 shown in FIG. 4, the center of the mounting base 39 is supported by a shaft portion 43, and the mounted honeycomb filter 1 can rotate like a roulette board around the shaft portion 43.

When the mounting base 39 is rotated half, the honeycomb filter 1 disposed in the detecting portion 33 is conveyed to a reversing portion 35 outside the storage chamber 19.

Figure 5:
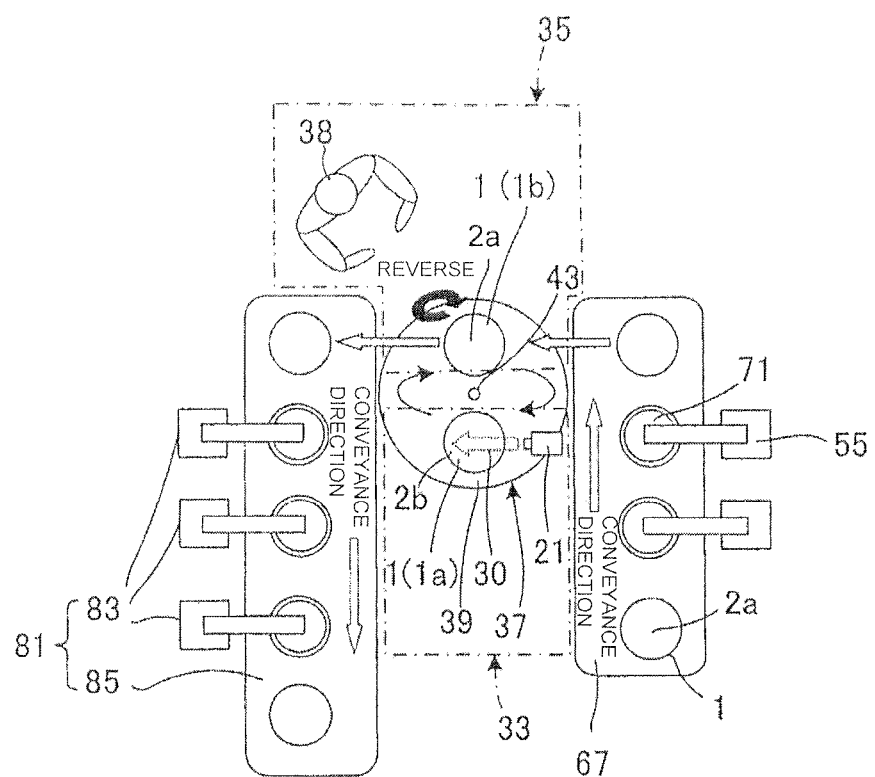
FIG. 5 is an exemplary overhead view of the whole filter inspection apparatus of FIG. 4.

FIG. 5 is an exemplary overhead view of the whole filter inspection apparatus of FIG. 4. It is to be noted that a part unnecessary for description with reference to this view is omitted. As shown, when the honeycomb filter 1a and a honeycomb filter 1b are disposed at positions symmetric with respect to the shaft portion 43 in the mounting base 39, the one honeycomb filter 1a can be disposed in the detecting portion 33, and the other honeycomb filter 1b can be disposed in the reversing portion 35.

In the reversing portion 35, the honeycomb filter 1b can vertically be moved and rotated in reverse. Moreover, the honeycomb filter 1b rotated in reverse can be left as it is on standby in the reversing portion 35 until the filter is disposed in the detecting portion 33.

As shown in FIG. 5, the honeycomb filter 1b may manually be moved vertically and rotated in reverse by an operator 38.

Further in the reversing portion 35, the honeycomb filter 1b may be moved vertically and rotated in reverse by a machine such as a gripping tool (not shown).

While the defect in the honeycomb filter 1a is detected by the detecting portion 33, the honeycomb filter 1b is moved vertically and rotated in reverse by the reversing portion 35, whereby it is possible to enhance an inspection efficiency.

In the inspection apparatus 100, the detection in one honeycomb filter can be performed twice by, for example, the following procedure. First, the honeycomb filter 1 which has come to an end point of the conveyor 67 is mounted on the mounting base 39 by the reversing portion 35. At this time, the honeycomb filter 1 is disposed with the end surface 2a on the downside and the end surface 2b on the upside. Then, the mounting base 39 is rotated half to transfer the honeycomb filter 1 to the detecting portion 33, the mist 20 is introduced into the end surface 2a of the honeycomb filter 1, and the water particles 7 in the mist 20 flowing out of the end surface 2b are detected, to perform the first defect detection. At this time, the other honeycomb filter 1 is mounted on the mounting base 39 in the reversing portion 35. After ending the first detection, the mounting base 39 is rotated half to transfer, to the reversing portion 35, the honeycomb filter 1 subjected to the first detection, and the honeycomb filter 1 is moved vertically and rotated in reverse (in the same manner as in the honeycomb filter 1b of FIG. 4). At this time, the mist 20 is introduced into the end surface 2a of the replacing honeycomb filter 1 disposed in the detecting portion 33, to perform the first defect detection in the honeycomb filter 1 (in the same manner as in the honeycomb filter 1a of FIG. 4). Afterward, the mounting base 39 is further rotated half, to transfer, to the detecting portion 33, the honeycomb filter 1 subjected to the first detection and left on standby in the reversing portion 35. Then, the mist 20 is introduced into the end surface 2b of the honeycomb filter 1, to perform the second defect detection.

The honeycomb filter 1 subjected to the above second defect detection is transferred to the reversing portion 35 by rotating the mounting base 39 half, and the filter is mounted on a conveyor 85 of a drying portion 81. The honeycomb filter 1 mounted on the conveyor 85 is exposed to dry air by blower portions 83, while being conveyed. In consequence, water can be removed from the honeycomb filter 1.

EXAMPLES

Hereinafter, the present invention will be described in more detail on the basis of examples, but the present invention is not limited to these examples.

In the present examples, a cylindrical honeycomb structure including partition walls made of a porous material and a large number of cells partitioned by the partition walls to become through channels of a fluid was used in a honeycomb filter as a test object. In this honeycomb structure, a portion inside a cylindrical outer peripheral wall (an outer diameter of 250 mm and an inner diameter of 1 mm) was partitioned by the partition walls to form a honeycomb configuration. Moreover, the outer peripheral wall and the partition walls were both made of cordierite, a cell sectional shape was a quadrangular shape, a partition wall thickness was 0.3 mm, and a cell density was 46.5 cells/$cm^2$. 85 cells were present along a diagonal line of the end surface of this honeycomb structure. This honeycomb structure was manufactured by extruding a kneaded clay having an adjusted appropriate viscosity by use of a die having the above cell shape, partition wall thickness and cell density, drying the kneaded clay, cutting both end surfaces, and obtaining the smooth surfaces. Furthermore, the end surfaces of this honeycomb structure were pressed into a ceramic slurry, to charge the ceramic slurry into predetermined cells, thereby plugging the corresponding cell end portions. Afterward, the structure was fired at 1450° C. to obtain a honeycomb filter which became a test object. It is to be noted that according to this manufacturing method, it is possible to manufacture a normal honeycomb filter (which does not have any defect). Moreover, in the above process of manufacturing the honeycomb filter, a predetermined treatment was further performed to manufacture the honeycomb filter in which defects were generated in 20 cells.

Examples 1 to 6 and Comparative Example 1

Moisture-containing air was introduced into each of the above two types of honeycomb filters (a normal honeycomb filter and a honeycomb filter in which defects were present in 20 cells) through one end surface of the honeycomb filter, to humidify the interior of the honeycomb filter, thereby obtaining a desired state. It is to be noted that in Comparative Example 1, humidification was not performed. An increased mass per liter of a volume of each honeycomb filter by this humidification is shown in Table 1.

TABLE 1

|  | Increase of mass by humidification (g/L) | Detection accuracy |
| --- | --- | --- |
| Example 1 | 0.05 | OK |
| Example 2 | 1.00 | Good |
| Example 3 | 10 | Excellent |
| Example 4 | 100 | Excellent |

TABLE 1-continued

| | Increase of mass by humidification (g/L) | Detection accuracy |
|---|---|---|
| Example 5 | 500 | Good |
| Example 6 | 600 | OK |
| Comparative Example 1 | None | NG |

After the humidification, water particles were introduced into one end surface of the honeycomb filter, and the water particles flowing out of the other end surface of the filter was irradiated with laser light, to measure the intensity of luminance due to the scattering of the laser light.

The detection accuracy was evaluated in four stages "excellent", "good", "OK" and "NG". When 18 or more defects were detected from 20 cells of the honeycomb filter including the 20 defective cells, the accuracy was judged to be "excellent" (a defect detection accuracy of 90% or higher). When 14 to 17 defects were detected from the 20 cells, the accuracy was judged to be "good" (a defect detection accuracy of 70% or higher and lower than 90%). When 10 to 13 defects were detected from the 20 cells, the accuracy was judged to be "OK" (a defect detection accuracy of 50% or higher and lower than 70%). When 9 or less defects were only detected from the 20 cells, the accuracy was judged to be "NG" (a defect detection accuracy of lower than 50%). The results are shown in Table 1. Moreover, it has been found that the luminance due to the scattering of the laser light in the normal honeycomb filter has a correlation with the height of the defect detection accuracy. That is, the higher the defect detection accuracy is, the higher the luminance due to the scattering of the laser light in the normal honeycomb filter becomes. Moreover, a contrast between a portion where the cell is open and a portion where the cell is plugged tends to become further clearer.

The present invention can be utilized as a filter inspection method in which defects such as holes and cracks generated in a porous filter are detected, and a filter inspection apparatus.

DESCRIPTION OF REFERENCE MARKS 1, 1a and 1b: honeycomb filter, 2a and 2b: end surface, 3, 3a, 3b, 3c and 3d: cell, 4: partition wall, 6: defect, 7: water particle, 8: outer peripheral wall, 10: plugged portion, 11: humidifier, 12: mist tank, 13: duct, 14: elevator, 15: camera, 16: arm, 17: image analysis device, 18: door, 19: storage chamber, 20: mist, 21: laser device, 23: water particle introducing portion, 25: measurement portion, 30: laser light, 33: detecting portion, 35: reversing portion, 37: mounting portion, 38: operator, 39: mounting base, 41: circulation hole, 43: shaft portion, 53: humidifying air supply portion, 55: sucking portion, 61: humidifier, 62: blower fan, 63: humidifying air storing chamber, 67: conveyor, 68: inner surface, 69: belt, 71: sucking cup, 73: duct, 75: exhaust fan, 77: elevating cylinder, 81: drying portion, 83: blower portion, 85: conveyor, and 100: inspection apparatus.

What is claimed is:

1. A filter inspection method comprising:
a humidifying step of exposing a porous filter to moisture-containing air on one side of the filter and sucking the moisture-containing air from the other ide of the filter to place the porous filter in a wet state; and
after the humidifying step is completed, performing a subsequent and separate detecting step of introducing water particles into the filter in the wet state through the humidifying step to detect the water particles which pass through and flow out of the filter, thereby detecting defects of the filter.

2. The filter inspection method according to claim 1, wherein in the humidifying step, a mass of the filter is increased as much as 0.05 to 600 g per liter of a volume of the filter by water contained in the moisture-containing air.

3. The filter inspection method according to claim 2, wherein in the humidifying step, the moisture-containing air is introduced under pressure into one side of the filter.

4. The filter inspection method according to claim 3, wherein while exposing the one filter to the moisture-containing air in the humidifying step, defects of another filter subjected to the humidifying step are detected in the detecting step.

5. The filter inspection method according to claim 2, wherein while exposing the one filter to the moisture-containing air in the humidifying step, defects of another filter subjected to the humidifying step are detected in the detecting step.

6. The filter inspection method according to claim 1, wherein in the humidifying step, the moisture-containing air is introduced under pressure into one side of the filter.

7. The filter inspection method according to claim 6, wherein while exposing the one filter to the moisture-containing air in the humidifying step, defects of another filter subjected to the humidifying step are detected in the detecting step.

8. The filter inspection method according to claim 1, wherein while exposing the one filter to the moisture-containing air in the humidifying step, defects of another filter subjected to the humidifying step are detected in the detecting step.

9. A filter inspection apparatus comprising:
humidifying means for exposing a porous filter to moisture-containing air to place the porous filter in a wet state; and
detecting means for introducing water particles into the filter exposed to the moisture-containing air and in the wet state through the humidifying means, to detect the water particles which pass through and flow out of the filter, thereby detecting defects of the filter.

10. The filter inspection apparatus according to claim 9, wherein the humidifying means increases a mass of the filter as much as 0.05 to 600 g per liter of a volume of the filter by water contained in the moisture-containing air.

11. The filter inspection apparatus according to claim 10, wherein while exposing one side of the filter to the moisture-containing air, the humidifying means sucks the moisture-containing air from the other side of the filter.

12. The filter inspection apparatus according to claim 10, wherein the humidifying means introduces the moisture-containing air under pressure into one side of the filter.

13. The filter inspection apparatus according to claim 10, wherein while the humidifying means exposes the one filter to the moisture-containing air, the detecting means detects defects of another filter.

14. The filter inspection apparatus according to claim 9, wherein while exposing one side of the filter to the moisture-containing air, the humidifying means sucks the moisture-containing air from the other side of the filter.

15. The filter inspection apparatus according to claim 9, wherein the humidifying means introduces the moisture-containing air under pressure into one side of the filter.

16. The filter inspection apparatus according to claim 9, wherein while the humidifying means exposes the one filter to the moisture-containing air, the detecting means detects defects of another filter.

* * * * *